United States Patent [19]

Kay et al.

[11] Patent Number: 5,032,660

[45] Date of Patent: Jul. 16, 1991

[54] CURABLE COMPOSITIONS

[75] Inventors: Peter D. Kay, Hartlepool; David A. Brown, Stockton on Tees, both of England

[73] Assignee: Tioxide Group plc, London, England

[21] Appl. No.: 422,459

[22] Filed: Oct. 17, 1989

[30] Foreign Application Priority Data

Nov. 4, 1988 [GB] United Kingdom ................. 8825864

[51] Int. Cl.$^5$ ............................................. C08G 77/06
[52] U.S. Cl. .......................................... 528/17; 528/23; 528/34; 528/401
[58] Field of Search ........................ 528/23, 17, 34, 401

[56] References Cited

U.S. PATENT DOCUMENTS

| | | | |
|---|---|---|---|
| 2,607,792 | 8/1952 | Warrick | 260/448.2 |
| 3,275,668 | 9/1966 | Revukas | 260/429.3 |
| 3,422,126 | 1/1969 | Bauer | 260/429.5 |
| 3,856,839 | 12/1974 | Smith et al. | 252/431 |
| 4,069,192 | 1/1978 | Monte et al. | 260/37 |
| 4,087,402 | 5/1978 | Monte et al. | 106/288 |
| 4,122,062 | 10/1978 | Monte et al. | 106/299 |
| 4,192,792 | 3/1980 | Sugerman et al. | 260/42.14 |
| 4,745,144 | 5/1988 | Itoh et al. | 524/123 |

FOREIGN PATENT DOCUMENTS

| | | |
|---|---|---|
| 0076630 | 4/1983 | European Pat. Off. . |
| 0175635 | 3/1986 | European Pat. Off. . |
| 835790 | 5/1960 | United Kingdom . |
| 1350420 | 4/1974 | United Kingdom . |
| 1525418 | 9/1978 | United Kingdom . |
| 2123432 | 2/1984 | United Kingdom . |
| 2161811A | 1/1986 | United Kingdom . |

*Primary Examiner*—Melvyn I. Marquis
*Attorney, Agent, or Firm*—Banner, Birch, McKie & Beckett

[57] ABSTRACT

Curable compositions comprise a silanol-terminated polyorganosiloxane, a cross-linking agent which is an organic silane free of isocyanate groups and a metal organic compound containing a Ti-O-P bond. The compositions cure on exposure to the atmosphere and, in comparison to known compositions containing organotitanium compounds show a reduced tendency to be discoloured.

13 Claims, No Drawings

CURABLE COMPOSITIONS

This invention relates to curable compositions and particularly to compositions containing a curable silicone.

According to the present invention a composition curable at room temperature comprises a silanol-terminated polyorganosiloxane, a cross-linking agent which is an organic silane free of isocyanate groups and a metal organic compound containing a Ti—O—P bond.

The compositions of the present invention when cured have a much reduced tendency to be coloured yellow than compositions containing other types of metal organic compounds and also other types of cross-linking agents.

The Ti—O—P group containing metal organic compounds may be used as catalysts, crosslinkers, chain extenders, adhesion promoters or water scavengers. The exact role of the Ti—O—P bond containing metal organic compound will be dependant upon the type of silane curing agent or crosslinker employed.

The compositions of the present invention are those based on polyorganosiloxanes which are silanol terminated and such siloxanes are those containing a hydroxyl group bonded to a silicon atom and which form a cured product by means of crosslinking.

Siloxanes of a wide range of viscosities and molecular weights can be used in the present invention and the siloxanes can have a wide range of chemical compositions containing various organic groups. Two or more different siloxanes can be mixed and cured simultaneously in a single composition in accordance with the present invention. Alkyl siloxanes or aryl siloxanes can be used as can alkyl-aryl siloxanes and examples of these are di-hydroxy-di-alkyl polysiloxanes, e.g. dihydroxydimethyl polysiloxane and dihydroxy alkylaryl polysiloxanes, e.g. dihydroxymethylphenyl polysiloxane.

Silanol-terminated polyorganosiloxanes are well known and preferably have a viscosity in the range of from about 100 to about 400,000 centipoise and more preferably from about 1000 to 250,000 centipoise when measured at 25° C. These silanol terminated fluids can be made by treating a higher molecular weight organopolysiloxane, such as dimethyl-polysiloxane with water in the presence of a mineral acid, or base catalyst, to tailor the viscosity of the polymer to the desired range. Methods for making such high molecular weight organopolysiloxane utilized in the production of silanol-terminated polydiorganosiloxane are well known. For example hydrolysis of a diorganohalosilane such as dimethyldichlorosilane, diphenyldichlorosilane, methylvinyldichlorosilane, or mixtures thereof, can provide for the production of low molecular weight hydrolysate. Equilibration thereafter can provide for higher molecular weight organopolysiloxane. Equilibration of cyclopolysiloxane such as octamethylcyclotetrasiloxane, octaphenylcyclotetrasiloxane, or mixtures thereof, will also provide for higher molecular weight polymers. Other methods that can be employed to make silanol-terminated polydiorganosiloxanes are more particularly described in U.S. Pat. No. 2 607 792 to Warrick and U.K. Patent No. 835 790

The compositions of the present invention include as a crosslinking agent an organic silane which is free of isocyanate groups. Examples of classes of silanes which are useful in the compositions of the present invention are those generally known as alkoxy silanes, oxime silanes and alkyl silanes with hydrolysable Si—N groups.

Alkoxy silanes which can be used are those having the general formula $R_xSi(OR^1)_{4-x}$ in which R represents a monovalent radical having 1 to 18 carbon atoms and is a hydrocarbon radical, a halohydrocarbon radical or a cyanoalkyl radical, which is a halogenated aliphatic hydrocarbon radical or an aliphatic hydrocarbon radical both having preferably less than 5 carbon atoms and x is 0 or 1. Examples of R groups are alkyl groups such as methyl, ethyl, propyl, hexyl or octadecyl, alkenyl radicals such as vinyl, allyl, hexenyl and methallyl radicals, cycloaliphatic hydrocarbon radicals, or alkyl hydrocarbon radicals such as benzyl radicals and aryl radicals. $R^1$ can be an alkyl group such as methyl, ethyl, propyl or butyl or a halogenated radical such as beta-chloroethyl, beta-chlorobutyl and beta-bromopropyl radicals. Specific silanes which are of use in the compositions of the present invention are methyltrimethoxy silane, tetraethoxy silane, ethyltrimethoxy silane, vinyltrimethoxy silane, tetrabutoxy silane, and phenyltrimethoxy silane.

Examples of oxime-silanes are those of the general formula $R^2_{4-n} Si(ON=CR^3_2)_n$ where each $R^2$ represents an alkyl group having less than 6 carbon atoms, a vinyl group, an allyl group or a phenyl group and each $R^3$ represents an alkyl group having from 1 to 6 carbon atoms and may be the same or different groups, a phenyl group or a cyclo aliphatic group and n has an average value of from 2.1 to 3. In the general formula for the oxime-silanes $R^2$ may be for example, methyl, ethyl, propyl, vinyl, allyl or phenyl. Examples of specific oximesilanes are methyltris(methylethyl ketoxime) silane, vinyltris(ethylethylketoxime)silane, methyltris (diethyl ketoxime) silane and phenyltris(methylethylketoxime) silane.

The crosslinking agent can also be an alkyl silane with hydrolysable Si—N groups of the general formula

in which $R^5$ represents an alkyl radical, an alkoxy group or cycloalkyl radical with up to 8 carbon atoms, $R^6$ represents H, —C(O)$R^7$ or $R^5$ in which $R^7$ represents an alkyl, cycloalkyl, aryl or aralkyl radical. Examples of these silanes which can be employed are dimethyldi-N-methyl benzamidosilane, ethoxy methyl-di-N-methyl benzamidosilane, dimethyl-dibutyl aminosilane, dimethylcyclohexylaminosilane, methyl ethyl-di-N-methylbenzamidosilane, methyl-propyl-di-N-methylbenzamidosilane and dicyclohexylaminosilanes. In the formula each $R^5$ group can be the same or can be different.

The metal organic compounds containing a Ti—O—P group useful in the present invention are such as those produced by reacting an organic phosphorus compound containing a P—OH group with a titanium orthoester.

Typical organic phosphorus compounds which can be used are the trivalent and pentavalent acid phosphorus compounds having the general formulae:

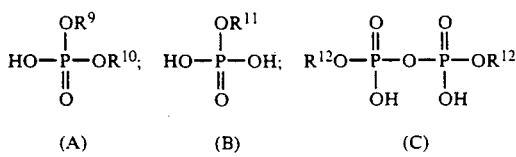

(A)　(B)　(C)

-continued

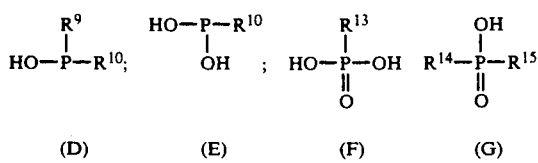

(D)    (E)    (F)    (G)

In the above mentioned formulae the R group identified represents substituted or unsubstituted hydrocarbon radicals and may be the same or different within each individual formula. Specific examples of the compounds are di-n-butyl acid phosphate, di(2-ethyl hexyl) acid phosphate, di-hexyl acid phosphate, mono-butyl acid phosphate, monohexyl acid phosphate, mono-2-ethyl hexyl acid phosphate, di-(2-ethyl hexyl) acid pyrophosphate, chloro-methyl phosphonic acid, propyl phosphonic acid, vinyl phosphonic acid, methyl phosphonic acid and ethyl (methyl) phosphinic acid.

Mono-alkyl acid phosphates or di-alkyl acid phosphates can be used to prepare the Ti—O—P group containing compounds but it is preferred to employ a mixture of the mono- and di-alkyl acid phosphates.

The alkyl acid phosphate is reacted with a titanium orthoester such as one having the general formula Ti-$(OR^{16})_4$ in which $R^{16}$ represents a substitued or unsubstituted hydrocarbon group and in any one compound two or more $R^{16}$ groups may be the same or different. Typical orthoesters are those containing alkyl groups with up to 10 carbon atoms, preferably up to 6 carbon atoms in each alkyl group and such orthoesters are tetra isopropyl titanate, tetra-n-butyl titanate, tetra-n-propyl titanate, tetra-iso-butyl titanate, tetra-2-ethyl hexyl titanate, and tetra-diethylene glycol titanate.

The preferred Ti—O—P group containing compounds usually are the reaction products of the titanium orthoester and alkyl acid phosphate in an amount of from 0.1 mole to 4 moles alkyl acid phosphate per mole of the titanium orthoester. Preferably the Ti:P mole ratio of the Ti—O—P group containing compound is within the range 1:0.5 to 1:2.

Usually the Ti—O—P group containing compound is prepared by reacting the titanium orthoester and the alkyl acid phosphate at room temperature and, if desired, removing any alcohol formed during the reaction under reduced pressure. Whilst it is preferred to remove the alcohol it is not necessary to do so.

The compositions of the present invention are prepared by mixing the essential ingredients in the absence of moisture together with any other desired components such as fillers or pigments. The filler can be one which reinforces the cured composition or not and typical fillers are those based on silica e.g. fumed silica, precipitated silica, silica aerogel or others such as calcium carbonate, fine mica or magnesia.

If desired the composition can contain a solvent to produce compositions of chosen viscosity which can be spread or otherwise applied to the surface to be treated.

Compositions containing from 0.1 to 30 parts by weight, preferably from 0.5 to 25 parts by weight of the crosslinking agent per 100 parts by weight of the polyorganosiloxane are useful. Also the amount of the Ti—O—P group containing compound is usually in the range 0.1 to 25 parts by weight, preferably 0.5 to 15 parts by weight and more preferably 0.5 to 8 parts by weight per 100 parts of the polyorganosiloxane.

Compositions of the present invention can be used as a coating material, a casting material, a filler or as a sealant. The compositions cure on exposure to the atmosphere producing crosslinked products having a much reduced tendency to be discoloured.

Each of the synthesis examples illustrates a process for synthesizing a Ti—O—P group containing metal organic compound which is useful in the present invention.

SYNTHESIS EXAMPLE 1

To a round bottomed flask equipped with a stirrer, dropping funnel thermometer and distillation apparatus (still-head, condenser and receiver) and containing 1.0 mole (284 gms) of tetraisopropyl titanate there was slowly added from the funnel 1.0 mole (266 g) of a commercial mixture of approximately equi-molar proportions of mono-2-ethylhexyl acid phosphate and di-2-ethylhexyl acid phosphate whilst stirring the reaction mixture. On completion of the addition the temperature of the mixture was raised to 90°–95° C. and the isopropyl alcohol released during the reaction was distilled off. 426 g of a clear, pale yellow liquid was obtained.

SYNTHESIS EXAMPLE 2

A Ti—O—P group containing metal organic compound was prepared in a manner similar to that described in Synthesis Example 1 from 1.0 mole (340 gms) of tetra-n-butyl titanate and 1.0 mole (224 gms) of a commercial mixture of approximately equi-molar proportions of mono-hexyl acid phosphate and di-hexyl acid phosphate. On removal of the n-butanol produced in the reaction, 434 g of a clear, almost colourless liquid was obtained.

SYNTHESIS EXAMPLE 3

A Ti—O—P group containing metal organic compound was prepared in a manner similar to that described in Synthesis Example 1 from 1.0 mole (284 gms) tetraisopropyl titanate and 4.0 moles (1064 gms) of a commercial mixture of approximately equi-molar proportions of mono-2-ethylhexyl acid phosphate and di-2-ethyl hexyl acid phosphate. On removal of the isopropyl alcohol (240 gms; 4.0 moles) produced in the reaction, 1108 g of a clear, yellow viscous liquid was obtained.

SYNTHESIS EXAMPLE 4

A Ti—O—P group containing metal organic compound was prepared in a manner similar to Synthesis Example 1 from 1.0 mole (284 gms) of tetraisopropyl titanate and 1.0 mole (206 gms) of commercially available methyl acid pyrophosphate. On removal of the isopropanol produced in the reaction, 394 g of a solid, white product was obtained.

SYNTHESIS EXAMPLE 5

A Ti—O—P group containing metal organic compound was prepared in a manner similar to Synthesis Example 1 from 1.0 mole (284 gms) of tetraisopropyl titanate and 1.0 mole (224 gms) of a commercial mixture of approximately equi-molar proportions of mono-hexyl acid phosphate and di-hexyl acid phosphate. On removal of the isopropanol produced in the reaction, 399 g of a clear, pale yellow liquid was obtained.

Synthesis Example 6

A Ti—O—P group containing metal organic compound was prepared in a manner similar to Synthesis Example 1 from 1.0 mol (340 gms) of tetraisobutyl titanate and 1.0 mole (224 gms) of a commercial mixture of approximately equi-molar proportions of mono-hexyl acid phosphate and di-hexyl acid phosphate. On removal of the isobutanol produced in the reaction, 430 g of a clear, pale yellow viscous liquid was obtained.

Preparation of the Silicone Sealant Masterbatches and Evaluation of the Ti—O—P group containing metal organic compounds

EXAMPLE 1

700 parts by weight of α, ω-dihydroxy-polydimethyl siloxane having a viscosity of 10,000 centipoise at 25° C. and 140 parts by weight of a methyl terminated polydimethylsiloxane having a viscosity of 300 centistokes at 25° C. were thoroughly mixed in a planetary mixer under reduced pressure. Once mixed, 100 parts by weight of fumed silica was added and thoroughly incorporated into the mixture again under reduced pressure.

100 parts by weight of the resultant silicone masterbatch was placed in a commercially available mixing cartridge fitted with a titanate/silane injector. The cartridge is known as Injection Style Semkit Package-Model 654 and supplied by Semco (a division of PRC).

3 parts by weight of methyl trimethoxy silane and 0.005 mole of a Ti—O—P group containing metal organic compound was injected and thoroughly mixed into silicone masterbatch.

The resultant compositions were spread on PTFE plates to a thickness of about 2 mm and allowed to cure in air at room temperature. The Skin-over time Tack-free time and Cure-through time for the compositions were determined and the colour of the cured sealant noted. Table 1 lists the titanates tested and the results obtained.

EXAMPLE 2

650 parts by weight of α, ω-dihydroxy-poly-dimethylsiloxane having a viscosity of 80,000 centipoise at 25° C. and 250 parts by weight of a methyl terminated polydimethylsiloxane having a viscosity of 1000 centistokes at 25° C. were thoroughly mixed in a planetary mixer under reduced pressure. 80 parts by weight of fumed silica was added and thoroughly incorporated into the mixture, again under reduced pressure. 100 parts by weight of the resultant silicone masterbatch was placed in a commercially available mixing cartridge fitted with a titanate/silane injector. 3.5 parts by weight of methyl-tri(methyl ethyl ketoximino) silane and 0.005 mole of a Ti—O—P group containing metal organic compound was injected and thoroughly mixed into the silicone masterbatch. Use of the injection style mixing cartridge significantly reduces the possibility of moisture ingress during the incorporation of the titanate and silane into the silicone masterbatch.

The resultant compositions were spread onto a PTFE plate to a thickness of about 2 mm and allowed to cure in air at room temperature. The Skin-over time, Tack-free time and Cure-through time for the compositions were determined and the colour of the cured sealant noted. Table 2 lists the titanates tested and the results obtained.

TABLE 2

| TITANIUM COMPOUND TESTED | SILANE CURING AGENT EMPLOYED | SKIN OVER TIME | TACK FREE TIME | CURE THROUGH TIME | COLOUR OF CURED SEALANT |
|---|---|---|---|---|---|
| NONE | MeSi[O—N=C(C$_2$H$_5$)(CH$_3$)]$_3$ | 8 hrs | 22 hrs | 48 hrs | PALE YELLOW |
| TILCOM KE2 | " | 4 hrs | 6 hrs | <24 hrs | YELLOW/PALE ORANGE |
| [EHAP]$_{1.0}$Ti[OCH(CH$_3$)$_2$]$_{2.0}$ | " | " | " | " | PALE YELLOW |
| [EHAP]$_{1.0}$Ti[O(CH$_2$)$_3$CH$_3$]$_{2.0}$ | " | " | " | " | " |
| [HAP]$_{1.1}$Ti[OCH(CH$_3$)$_2$]$_{2.0}$ | " | " | " | " | " |
| [HAP]$_{1.2}$Ti[O(CH$_2$)$_3$CH$_3$]$_{2.0}$ | " | " | " | " | " |

EXAMPLE 3

450 parts by weight of α, ω-dihydroxy-poly-dimethylsiloxane having a viscosity of 50,000 centistokes at 25° C. and 109 parts by weight of a methyl terminated polydimethylsiloxane were thoroughly mixed in a planetary mixer under reduced pressure. 70 parts by weight of fumed silica and 7 parts by weight of dibutyl tin

TABLE 1

| TITANIUM COMPOUND TESTED | SILANE CURING AGENT EMPLOYED | SKIN OVER TIME | TACK FREE TIME | CURE THROUGH TIME | COLOUR OF CURED SEALANT |
|---|---|---|---|---|---|
| [EHAP]$_{0.5}$Ti[OCH(CH$_3$)$_2$]$_3$ | CH$_3$Si(OMe)$_3$ | 10 mins | 10–15 mins | <10 hrs | COLOURLESS |
| [EHAP]$_{1.0}$Ti[OCH(CH$_3$)$_2$]$_{2.0}$ | CH$_3$Si(OMe)$_3$ | 10 mins | 10–15 mins | <10 hrs | COLOURLESS |
| [EHAP]$_{1.0}$Ti[O(CH$_2$)$_3$CH$_3$]$_{2.0}$ | CH$_3$Si(OMe)$_3$ | 10 mins | 10–15 mins | <10 hrs | COLOURLESS |
| [EHAP]$_{4.0}$Ti | CH$_3$Si(OMe)$_3$ | 15 mins | 50–60 mins | <24 hrs | COLOURLESS |
| [HAP]$_{1.1}$Ti[OCH(CH$_3$)$_2$]$_{2.0}$ | CH$_3$Si(OMe)$_3$ | 10 mins | 20 mins | <10 hrs | COLOURLESS |
| [HAP]$_{1.2}$Ti[O(CH$_2$)$_3$CH$_3$]$_{2.0}$ | CH$_3$Si(OMe)$_3$ | 10 mins | 20 mins | <10 hrs | COLOURLESS |
| TILCOMKE2 | CH$_3$Si(OMe)$_3$ | 10 mins | 20 mins | <10 hrs | PALE YELLOW |
| NONE | CH$_3$Si(OMe)$_3$ | 8 hrs | 24 hrs | <48 hrs | COLOURLESS |

NOTE:
(1) The Ti—O—P group containing metal-organic compounds shown in Table 1 were prepared as previously described and derived from the commercially available equi-molar mixtures of either mono-and di-2-ethylhexyl acid phosphate [EHAP], or mono- and di hexyl acid phosphate [HAP].
(2) TILCOM KE2, which is diisopropoxy-titanium bis(ethylacetoacetate), is a commercially available product supplied by the Chemicals Division of Tioxide UK Limited and tested for purposes of comparison.

dilaurate were added and thoroughly incorporated into the mixture, again under reduced pressure.

100 parts by weight of the resultant silicone masterbatch was placed in a commercially available mixing cartridge fitted with a titanate/silane injector. 5.0 parts by weight of methyl-, ethoxy- bis (N-methyl benzamido) silane [Vernetzer BA] and 0.012 mole of a Ti—O—P group containing metal organic compound was injected and thoroughly mixed into the silicone masterbatch.

The resultant compositions were spread onto a PTFE plate to a thickness of about 2 mm and allowed to cure in air at room temperature. The Skin-over time, Tack-free time and Cure-through time for the compositions were determined and the colour of the cured sealant noted. Table 3 list the titanates tested and the results obtained.

ity at 25° C. in the range of from about 100 to about 400,000 centipoise.

4. A composition according to claim 3 in which the viscosity at 25° C. of the said silanol-terminated polyorganosiloxane is in the range of from about 1000 to 250,000 centipoise.

5. A composition according to claim 1 in which R represents an alkyl group containing up to 6 carbon atoms.

6. A composition according to claim 1 in which the said metal organic compound has a Ti:P molar ratio of from 10:1 to 1:4.

7. A composition according to claim 6 in which the said Ti:P molar ratio is from 2:1 to 1:2.

8. A composition according to claim 1 in which the said metal organic compound is a compound produced by reacting a mixture of mono- and di-alkyl acid phosphates with a titanium orthoester and removing alcohol formed during the reaction.

TABLE 3

| TITANIUM COMPOUND TESTED | SILANE CURING AGENT EMPLOYED | SKIN OVER TIME | TACK FREE TIME | CURE THROUGH TIME | COLOUR OF CURED SEALANT |
|---|---|---|---|---|---|
| NONE | 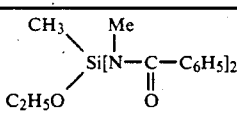 | <10 mins | <10 mins | <24 hrs | WHITE |
| TITANATE 'A' | " | 30 mins | 60–70 mins | " | PALE ORANGE |
| [EHAP]$_{1.0}$Ti[OCH(CH$_3$)$_2$]$_{2.0}$ | " | 10 mins | 15 mins | " | WHITE |
| [EHAP]$_{1.0}$Ti[O(CH$_2$)$_3$CH$_3$]$_{2.0}$ | " | 20 mins | 25 mins | " | " |
| [EHAP]$_{1.0}$Ti[OCH$_2$CH(CH$_3$)$_2$]$_{2.0}$ | " | 30 mins | 60–70 mins | " | " |
| [EHAP]$_{1.0}$Ti[O(CH$_2$)$_2$CH$_3$]$_{2.0}$ | " | 20 mins | 25 mins | " | " |

NOTE:
$^{(1)}$'TITANATE 'A' which is di isobutoxy-titanium bis(ethylacetoacetate), was tested for comparative purposes.

We claim:

1. A composition curable at room temperature which comprises (a) a silanol-terminated polyorganosiloxane, (b) a cross-linking agent which is an organic silane free of isocyanate groups selected from the class consisting of alkoxysilanes, oxime silanes and alkyl silanes with hydrolysable Si—N groups, and (c) a metal organic compound containing a Ti—O—P bond which is the reaction product of (c1) a titanium orthoester of formula Ti(OR)$_4$ in which R represents an alkyl group containing up to 10 carbon atoms and (c2) a mixture of mono- and di-alkyl acid phosphates.

2. A composition according to claim 1 in which the said silanol-terminated polyorganosiloxane is selected from the class consisting of alkyl siloxanes, aryl siloxanes and alkyl-aryl siloxanes.

3. A composition according to claim 1 in which the said silanol-terminated polyorganosiloxane has a viscos- 9. A composition according to claim 1 in which the said cross-linking agent is present in an amount of 0.1 to 30 parts by weight per 100 parts of said polyorganosiloxane.

10. A composition according to claim 9 in which the amount of cross-linking agent is from 0.5 to 25 parts by weight per 100 parts of said polyorganosiloxane.

11. A composition according to claim 1 in which the amount of said metal organic compound is in the range 0.1 to 25 parts by weight per 100 parts of said polyorganosiloxane.

12. A composition according to claim 11 in which the amount of metal organic compound is in the range 0.5 to 15 parts by weight per 100 parts polyorganosiloxane.

13. A composition according to claim 11 in which the amount of metal organic compound is in the range 0.5 to 8 parts by weight per 100 parts polyorganosiloxane.

* * * * *